United States Patent [19]
Inoue et al.

[11] Patent Number: 5,912,449
[45] Date of Patent: Jun. 15, 1999

[54] BAR CODE READER HAVING A LIGHT SOURCE LOCATED IN A MIRROR REFLECTION AREA

[75] Inventors: Katsushi Inoue, Kyoto; Masakazu Tsuruzono, Katano; Keiichi Kobayashi, Higashiosaka; Toshihiro Yoshioka, Katano, all of Japan

[73] Assignee: Matsushita Electric Industrial Co., Ltd., Osaka-Fu, Japan

[21] Appl. No.: 08/837,463

[22] Filed: Apr. 18, 1997

[30] Foreign Application Priority Data

Apr. 19, 1996 [JP] Japan .................................. 8-098239

[51] Int. Cl.⁶ ...................................................... G06K 7/10
[52] U.S. Cl. ............................ 235/462; 235/472; 235/454
[58] Field of Search ..................................... 235/462, 472, 235/454, 457; 250/234, 235, 236

[56] References Cited

U.S. PATENT DOCUMENTS

| | | | |
|---|---|---|---|
| 3,758,753 | 9/1973 | Myer | 235/454 |
| 4,488,678 | 12/1984 | Hara et al. | 235/462 X |
| 4,516,017 | 5/1985 | Hara et al. | 235/472 |
| 4,818,847 | 4/1989 | Hara et al. | 235/472 X |
| 4,916,297 | 4/1990 | Tukada et al. | 235/462 |
| 5,004,916 | 4/1991 | Collins, Jr. et al. | 235/472 X |
| 5,153,417 | 10/1992 | Sakai et al. | 235/457 |
| 5,231,536 | 7/1993 | Wilt et al. | 250/237 R X |
| 5,430,285 | 7/1995 | Karpen et al. | 235/472.01 |
| 5,449,892 | 9/1995 | Yamada | 235/472 X |
| 5,585,615 | 12/1996 | Iwanami et al. | 235/472 |

FOREIGN PATENT DOCUMENTS

| | | |
|---|---|---|
| 3-116457 | 12/1991 | Japan . |
| 4-160580 | 6/1992 | Japan . |
| 2257280 | 1/1993 | United Kingdom . |
| 95/35506 | 12/1995 | WIPO . |

*Primary Examiner*—Michael G. Lee
*Attorney, Agent, or Firm*—Wenderoth, Lind & Ponack, L.L.P.

[57] ABSTRACT

A compact, lightweight, low cost bar code reader comprising a light reflector which reflects and emits to a bar code label light emitted from light sources and passed through a cylindrical lens. The light sources are located inside a boundary line of a mirror reflection area and the light reflector is located outside the boundary line of the mirror reflection area so that mirror reflection does not occur with the bar code reader.

5 Claims, 5 Drawing Sheets

BAR CODE READER HAVING A LIGHT SOURCE LOCATED IN A MIRROR REFLECTION AREA

BACKGROUND OF THE INVENTION

1. Field of the invention

The present invention relates to a bar code reader for reading bar codes.

2. Description of the prior art

The basic structure of a bar code reader according to a first example of the prior art is shown in FIG. 4. Shown in FIG. 4 are the bar code label 1, plural light sources 2, and a cylindrical lens 3 for focusing the light emitted from the light sources 2. Also shown are the projector P which includes the light sources 2 and cylindrical lens 3, and a receptor Q, which includes a detector reflecting mirror 4, imaging lens 5, and image sensor 6. Circuitry 7 is also provided inside the case 8. Note that the light path from the light sources 2 to the image sensor 6 is shown by the dot-dash line in FIG. 4.

FIG. 5A and FIG. 5B show the distance (path length) from the image sensor 6 of the receptor Q to the bar code label 1. Assuming that the bar code label I is a mirror, the image sensor 6 may capture anything that falls in the area between lines L1 and L2. Such an area is called a mirror reflection area. In other words, the mirror reflection area is an area viewed from the image sensor 6 and reflected on the bar code label 1. Depending on the material of the bar code label 1, the surface of the bar code label 1 may be smooth as with mirrors, or irregular, as with paper. A smooth bar code label surface, may result in regular reflection or total internal reflection, causing the image sensor 6 to capture an image of articles that falls within the mirror reflection area.

Note that the distance (path length) from the image sensor 6 to the bar code label 1 shown in FIG. 5A is three times the path length shown in FIG. 5B. Note, further, that the detector reflecting mirror 4 has been deleted from FIG. 5A and 5B for simplicity only, and the relationship between the bar code label 1, imaging lens S, and image sensor 6 in FIGS. 5A and 5B is the same as that shown in FIG. 4.

If the light sources 2 are placed within the mirror reflection area, i.e., the area between lines L1 and L2, in FIG. SA or 5B, light from the light sources 2 is reflected from the bar code label 1 with total or nearly total internal reflection, provided that the surface of the bar code label 1 is smooth and resistant to irregular reflection, such as when the label is printed on a laminated paper. Because light reflected with total or nearly total internal reflection is stronger than irregularly reflected light, the output of the image sensor 6 is saturated as shown by peaks J and K in FIG. 6A. When this occurs the information contained in the bar code label 1 cannot be correctly determined, and bar code reading is disabled.

Note that the waveform shown in FIG. 6A was obtained using a linear image sensor as the image sensor 6 and two LEDs as the light sources 2 disposed in the mirror reflection area. The positions of the light sources 2, as seen from the front of the bar code reader generating the image sensor output voltage shown in FIG. 6A, are shown in FIG. 6B where 2J and 2K are the LEDs.

To avoid the light source mirror reflection area of bar code label 1, the light sources 2 are located outside the mirror reflection area.

Referring to FIG. 5B, the front (beginning) of the bar code label 1 as seen from the bar code reader during bar code reading is point A. The bar code end is point B. The distances from points A and B to point b at distance D1 from point A are lengths L7 and L8. The distances from points A and B to point c at distance D2 from point A are lengths L3 and L4. In FIG. 5A the distance from point A to point a is L5, and the distance from point B to point a is L6.

When the luminance distribution obtained by the bar code reader of FIG. 5A is considered as one standard luminance distribution, the same standard luminance distribution is obtained in the case of FIG. 5B when the light source 2 is located at point c. Specifically, in the case of FIG. 5A, the distance from the image sensor 6 to the bar code label 1 is 3 M, and the light sources 2 are located at point a. In the case of FIG. 5B, the distance from the image sensor 6-to-the bar code label 1 is M, and the light sources 2 are located at point c. Point c is selected at such a point as to satisfy the same distance ratio as L6/L5. Thus, L6/L5=L4/L3. If the light sources 2 are placed at any point which does not have the same distance ratio as L6/L5, such as at point b in which L6/L5<L8/L7, the same standard luminance distribution will not be obtained.

To avoid mirror -reflections, conventional bar code readers have been constructed as shown in FIG. 4 with an increased distance (path length) from the image sensor 6 to the bar code label 1 (first construction), or as shown in FIG. 7 with a shortened distance (path length) from the image sensor 6 to the bar code label 1 (second construction). In this second construction the light sources 2 are located outside the mirror reflection area farther from the center of the reading aperture.

The problems with the conventional bar code readers shown in FIG. 4 and FIG. 7 include a large physical shape, a poor aesthetic design, and greater bar code reader weight resulting in poor operability.

Another general problem associated with increasing the distance (path length) from the image sensor 6 to the bar code label 1 with the design shown in FIG. 4 is that good surface precision and installation precision are required with the detector reflecting mirror 4 because of limitations on the case design and component placement. These requirements result in increased bar code reader cost.

SUMMARY OF THE INVENTION

Therefore, the object of the present invention is to resolve the above problems and provide a low cost, compact bar code reader To achieve the above objects, a bar code reader according to the present invention includes: a case; a projector; a receptor; and circuitry. The projector is for emitting light to a bar code label; the receptor is for detecting the reflected light from the bar code label and imaging the reflected light on an image sensor. The circuitry is for receiving data from the image sensor and reading the bar code. Also an area viewed from the image sensor and reflected on the bar code label is provided and is referred to as a mirror reflection area. According to the present invention, the projector includes: a light source disposed in the mirror reflection area; a shield for preventing light from the light source from being impinged directly on to the bar code label; and a light reflector disposed outside the mirror reflection area for reflecting the light from the light source to illuminate the bar code label.

By disposing the light source and cylindrical lens inside the mirror reflection area, the bar code reader according to this first embodiment of the invention is compact.

The light reflector can be either a mirror or a prism. When the prism is used, the spectral characteristics of the prism may be varied to select a particular light emitted by the light source and emit to the bar code label only light of a particular effective wavelength. It is therefore, also possible to avoid emitting light of unnecessary wavelengths to the bar code label, and thereby reduce blurring caused by chromatic aberrations of the imaging lens.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
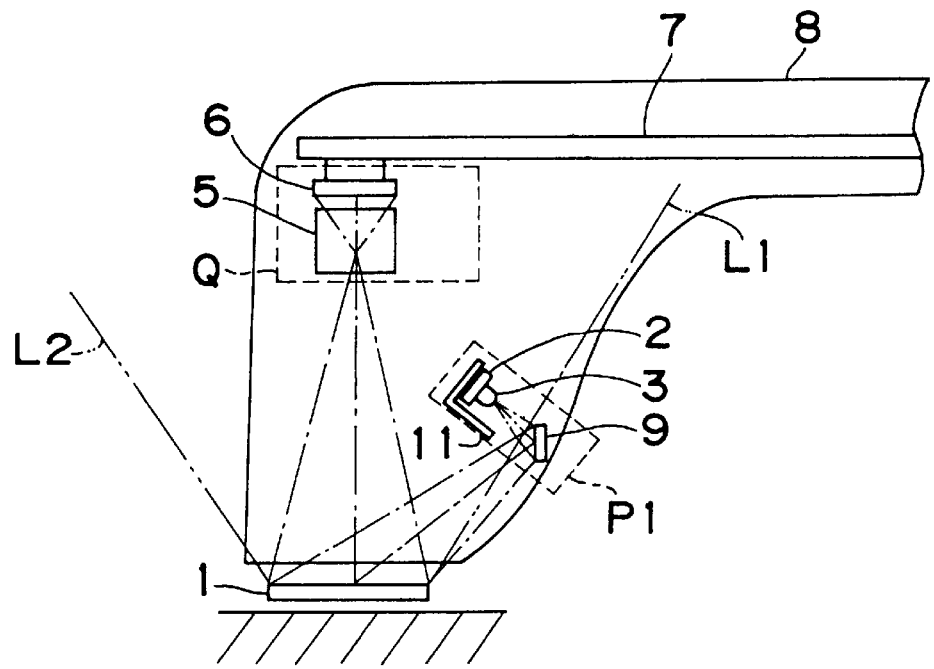
FIG. 1 is a partial side view of a bar code reader according to the first embodiment of the invention.

The preferred embodiments of the present invention are described below with reference to the accompanying FIGS. 1 to 3. Note that like parts in FIGS. 1–3 and FIGS. 4–7 used above to describe the prior art are labeled below using the same reference numerals.

Embodiment 1

FIG. 1 is a partial side view of a bar code reader according to the first embodiment of the invention.

Shown in FIG. 1 are the bar code label 1, plural light sources 2, which may be LEDs or semiconductor lasers, and a cylindrical lens 3 for focusing the light emitted from the light sources 2. Note that the cylindrical lens 3 is only needed depending upon the type of light sources 2 used, and is therefore not always provided. Also shown is a projector P1 which includes the light sources 2, cylindrical lens 3, shield 11, and light reflector 9. A receptor Q is also provided which includes an imaging lens 5, and image sensor 6. Circuitry 7 is also provided inside a case 8 for receiving data from the image sensor 6 and reading the bar code. Note that the light path from the light sources 2 to the image sensor 6 is shown by the dot-dash line in FIG. 1.

In the embodiment shown in FIG. 1, the light reflector 9 is a mirror for reflecting and emitting to the bar code label 1 light emitted from the light sources 2 and focused on the mirror 9 by a cylindrical lens 3. Note that a plurality of light sources 2, such as two, are aligned in the direction perpendicular to the sheet on which FIG. 1 is drawn. The shield 11 has such a length as to completely block light emitted from the light source 2 and the lens 3 from directly impinging on the bar code label 1.

Mirror reflection (regular reflection) by the bar code label 1 occurs if the light source is inside the mirror reflection (regular reflection) area, the right boundary of which is indicated by double-dot-dash lines L1 and L2 as seen in FIG. 1. In other words, assuming that the bar code label 1 is a mirror, anything which falls between the boundary lines L1 and L2 can be captured by the image sensor 6. If the light sources 2 are positioned within the boundary lines L1 and L2 without any shield and aimed directly at the bar code label 1, the light reflected from the bar code label 1 would directly impinged on the image sensor 6, resulting in unwanted light spots in the image captured by the image sensor 6.

According to the present invention, to avoid the direct light impingement from the light sources 2 to the image sensor 6, the light emitted from the light sources 2 is directed toward a point outside the boundary line L1 and reflected by the reflector 9 which is located outside the boundary line L1.

According to the present invention, a light reflector 9 is used to reflect the light from the light sources 2 to the bar code label 1, thereby illuminating the bar code label 1 as though the light sources 2 and cylindrical lens 3 are physically located outside the mirror reflection area, i.e., the area between lines L1 and L2.

Figure 2:
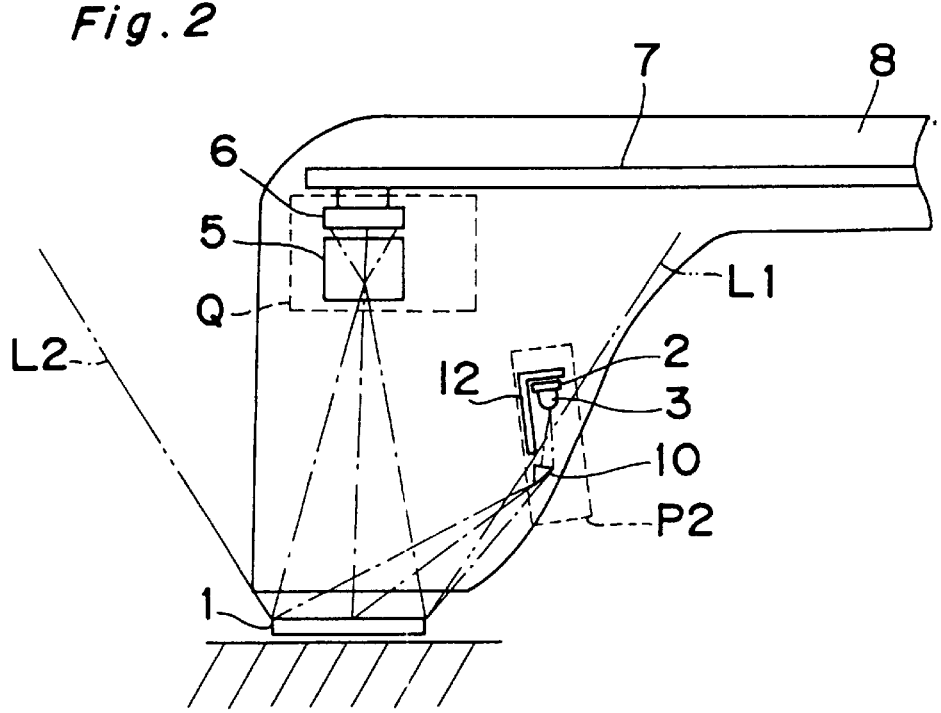
FIG. 2 is a partial side view of a bar code reader according to the second embodiment of the invention.

According to the present invention, the case 8 can be designed such that the walls located around the light path can be aligned relatively close to the boundary line L1, as shown in FIGS. 1 and 2, while also keeping at least a space between the line L1 and the wall of the case 8 to dispose the light reflector 9.

Embodiment 2

FIG. 2 is a partial side view of a bar code reader according to the second embodiment of the invention. Note that like parts are identified by the same reference numbers in FIG. 2 and FIG. 1. This embodiment differs from the first in that this embodiment uses an optical reflector 10, which is for example a prism. Light from the light sources 2 passes through the cylindrical lens 3, is refracted by the reflector 10, and is emitted from the reflector 10 to illuminate the bar code label 1.

As shown by the dotted line in FIG. 2, the projector P2 of this embodiment includes the light sources 2, cylindrical lens 3, and reflector 10. Note, further, that the light path from the light sources 2 to the image sensor 6 is shown by the dot-dash lines in FIG. 1 and FIG. 2.

It should be noted that while an area sensor is preferably used for the image sensor 6 in both the first and second embodiments shown in FIG. 1 and FIG. 2, a linear image sensor can be used. Linear or 2D-bar code labels 1 can also be used.

Figure 4:
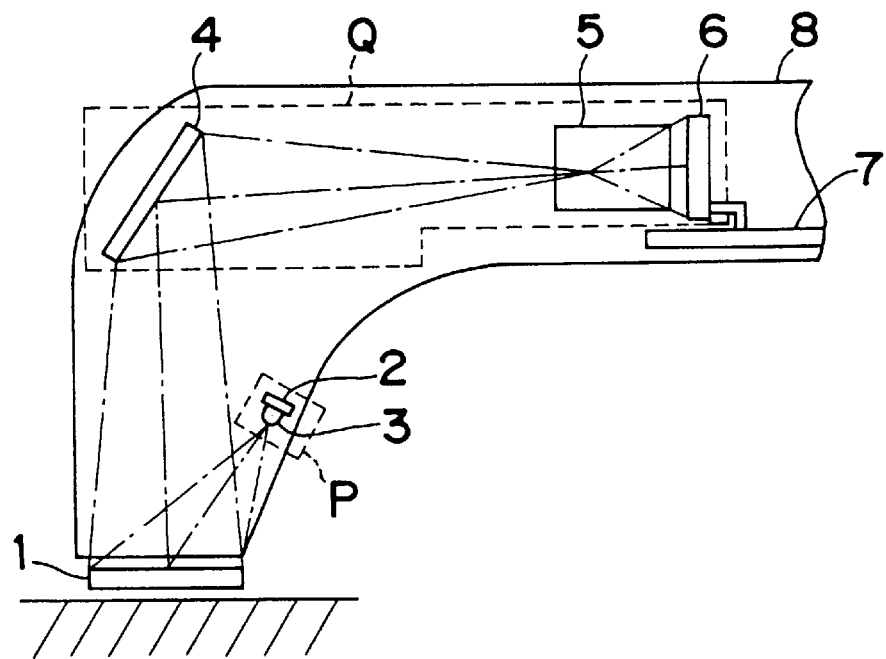
FIG. 4 is a partial side view of a bar code reader according to the prior art.
Figure 5A:
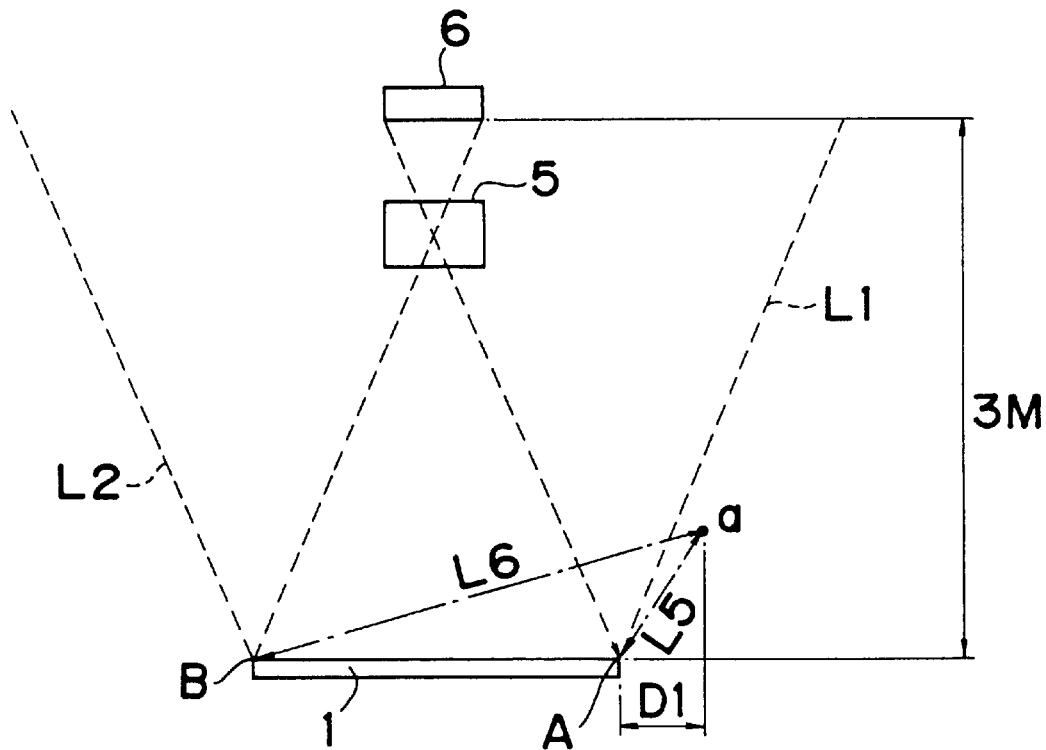
FIG. 5A is a simplified illustration of the mirror reflection area and its relationship with the distance (path length) from the image sensor to the bar code label.
Figure 5B:
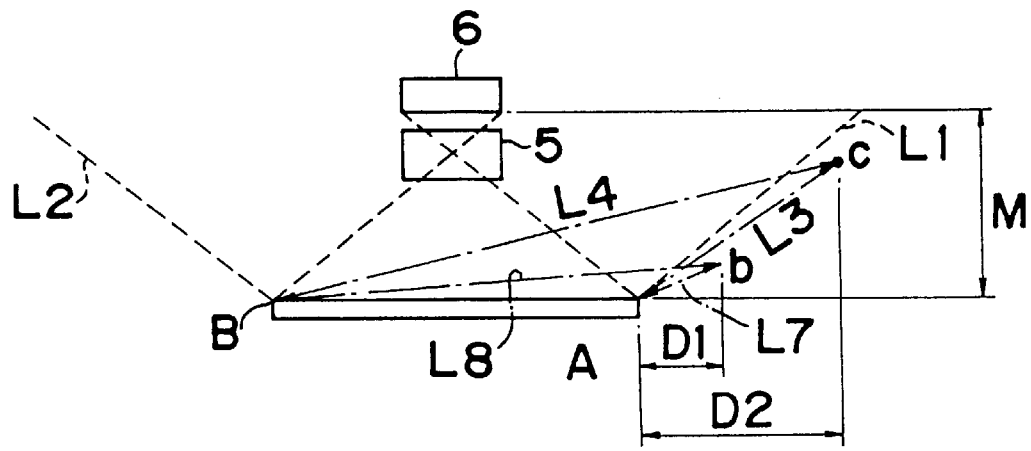
FIG. 5B is a diagram similar to FIG. 5A, but with a shorter distance (path length) from the image sensor to the bar code label.
Figure 6A:
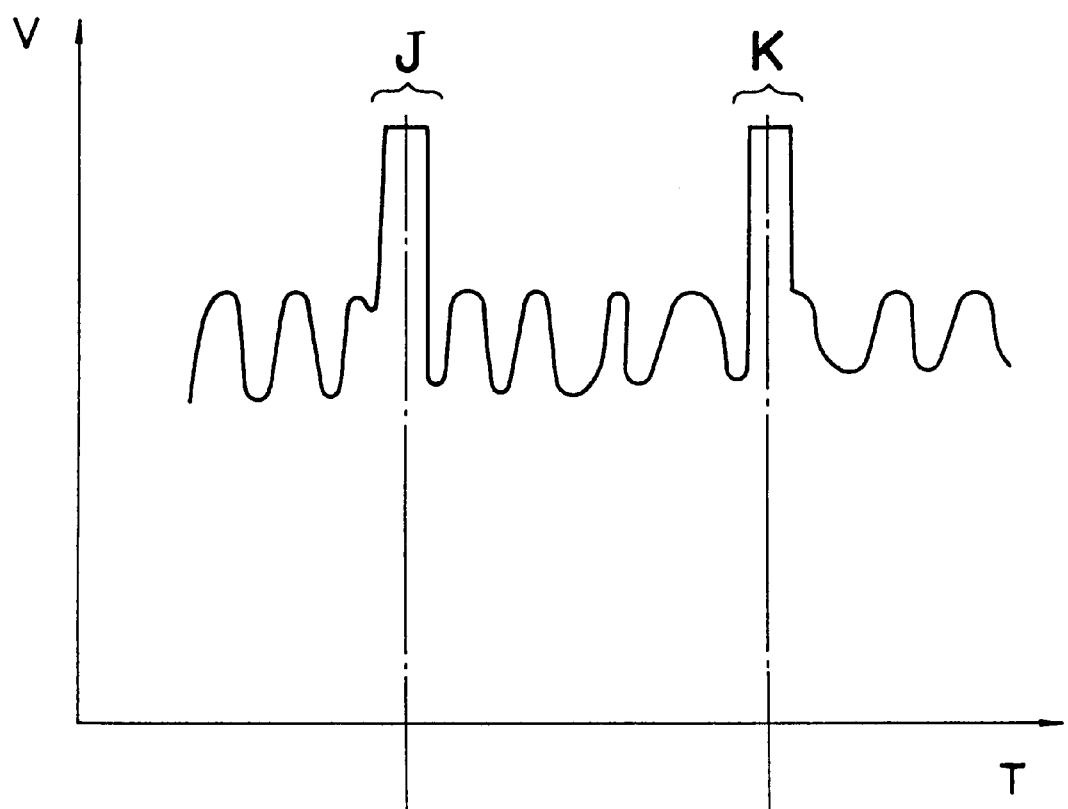
FIG. 6A is a waveform diagram showing the output voltage of the image sensor when mirror reflection occurs.
Figure 6B:
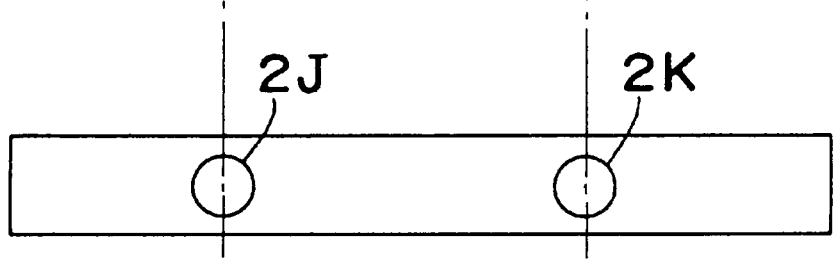
FIG. 6B is a diagram showing the position of the light sources as seen from the front of the bar code reader when the waveform shown in FIG. 6A occurs.

A detector reflecting mirror 4, such as shown in FIG. 4, can also be used for bar code reader design considerations, including to reduce the height. Details of the circuitry 7, the reading-completed buzzer and LED, and cable for communicating with the point-of-sale station or host have also been omitted from the figures for simplicity.

Figure 7:
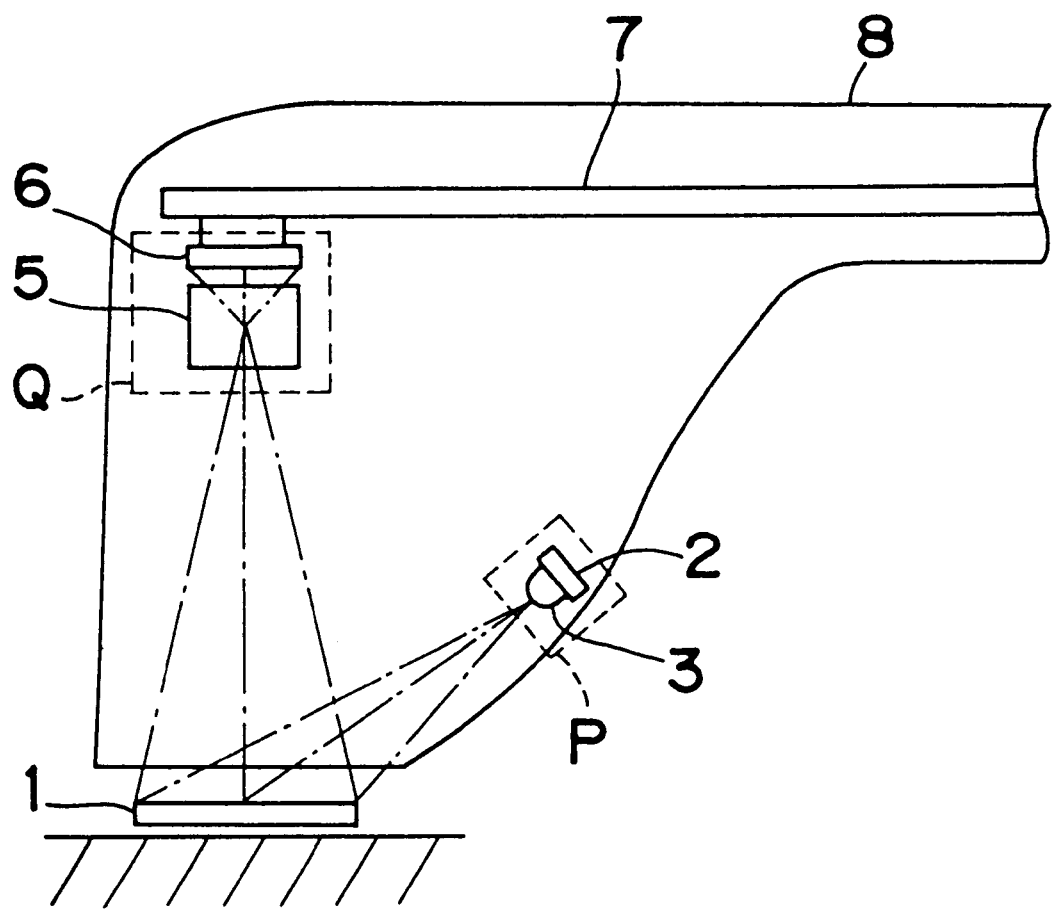
FIG. 7 is a partial side view of a bar code reader according to another example of the prior art.

The differences between a bar code reader using a light reflector 9 according to the first embodiment of the invention as shown in FIG. 1, and a conventional bar code reader not using a light reflector 9 as shown in FIG. 7, are described next below with reference to FIG. 3.

Figure 3:
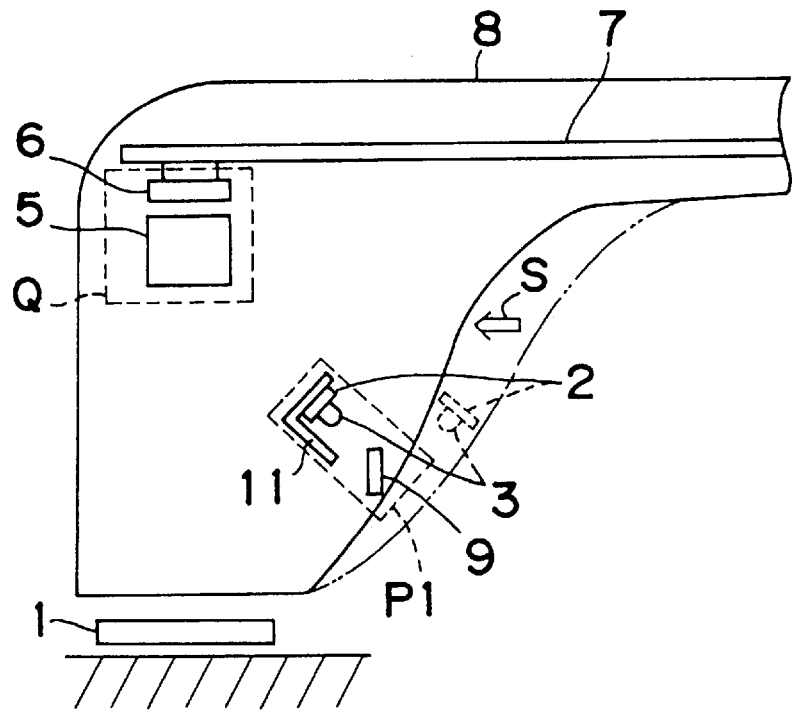
FIG. 3 is a partial side view of a bar code reader used to compare the case profiles of a conventional bar code reader and the bar code reader according to the first embodiment of the invention.

FIG. 3 indicates the positions of the light sources 2 and cylindrical lens 3 in the first embodiment of the invention and the prior art, and the corresponding shapes of the case 8. Note further that in FIG. 3 the solid line indicates the case profile in the present invention, and the dot-dot-dash line indicates the profile of the conventional case 8.

As indicated by arrow S in FIG. 3, the case 8 can be made substantially smaller by providing a light reflector 9 according to the present invention.

As described above, the bar code reader according to the first embodiment of the present invention can be made smaller because the light source can be disposed inside the mirror reflection area. This provides a greater degree of design freedom, reduces bar code reader weight and thus improves operability. This effect is greater in a bar code reader using an area image sensor rather than a linear image sensor because the regular reflection area of an area image sensor is greater than that of a linear image sensor.

In addition, by shortening the distance (path length) from the image sensor to the bar code label the need for a reflecting mirror for detection is eliminated. While a mirror is still used as the light reflector, the installation and surface precision requirements of the mirror as the light reflector are not as great as those of the reflecting mirror for detection, and the cost can therefore be reduced. The light reflector is also less affected by soiling.

Furthermore, by selecting the wavelength (color) of light emitted to the bar code label using the spectral characteristics of the prism in a bar code reader according to the second embodiment of the invention, the effects of chrominance aberrations of the imaging lens are reduced by emitting light that is closer to single wavelength light. Blurring is therefore reduced and bar code label reading performance is enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bar code reader for use in reading a bar code label when located in a bar code label reading position relative to the bar code label, said bar code reader comprising:

a case;

an image sensor provided in said case;

a projector provided in said case and operable to emit light onto the bar code label when said bar code reader is in the bar code label reading position, said projector comprising a light source located within a mirror reflection area constituted by an area within which an image is viewable from said image sensor in a reflection off of the bar code label when said bar code reader is in the bar code label reading position, a shield arranged to prevent light from said light source from directly impinging on the bar code label when said bar code reader is in the bar code label reading position, and a light reflector, located outside the mirror reflection area and thus not viewable by said image sensor in a reflection off of the bar code label, arranged to reflect light from said light source onto the bar code label when said bar code reader is in the bar code label reading position;

a receptor, provided in said case, operable to detect light reflected from the bar code label and to image the reflected light onto said image sensor when said bar code reader is in the bar code label reading position; and circuitry for receiving data from said image sensor and for reading the bar code label.

2. The bar code reader of claim 1, wherein said light reflector comprises a mirror.

3. The bar code reader of claim 1, wherein said light reflector comprises a prism.

4. The bar code reader of claim 1, wherein said image sensor comprises an area image sensor.

5. The bar code reader of claim 1, wherein: said case has a wall closely provided to a boundary of the mirror reflection area; and said light reflector is provided between the boundary and said wall.

* * * * *